(12) United States Patent
Hutter et al.

(10) Patent No.: US 6,216,908 B1
(45) Date of Patent: Apr. 17, 2001

(54) PIVOTAL FUEL SENDING UNIT

(75) Inventors: Robert B. Hutter, Plymouth Township; Donna M. Hale, Clinton Township; Patrick T. Muldoon, Adrian, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/302,205

(22) Filed: Apr. 29, 1999

(51) Int. Cl.$^7$ ..................................................... B65D 88/22
(52) U.S. Cl. ...................... 220/562; 137/264; 220/478; 220/631
(58) Field of Search ...................... 137/264, 571, 137/558; 220/694, 562–564, 478, 629–631; 248/133, 137, 130, 142, 145, 372.1; 222/164, 166

(56) References Cited

U.S. PATENT DOCUMENTS

| 730,312 | * | 6/1903 | Conover | 62/317 |
|---|---|---|---|---|
| 1,705,580 | * | 3/1929 | Marburger | 248/142 |
| 3,127,065 | * | 3/1964 | Stevenson | 22/164 |
| 3,856,183 | * | 12/1974 | Bauer | 222/604 |
| 4,738,582 | * | 4/1988 | Roberts | 414/546 |
| 4,790,185 | | 12/1988 | Fedelem et al. | |
| 5,089,675 | | 2/1992 | Betterton et al. | |

FOREIGN PATENT DOCUMENTS

| 405598 | * | 6/1943 | (AP) | 137/264 |
|---|---|---|---|---|
| 411177 | * | 6/1943 | (AP) | 137/264 |

* cited by examiner

Primary Examiner—Allan N. Shoap
Assistant Examiner—Joe Merek
(74) Attorney, Agent, or Firm—Kenneth H. Maclean

(57) ABSTRACT

A fuel sending unit for an off-road vehicle subject to upward impacts on a fuel tank of the vehicle. The fuel sending unit includes a cannister providing a reservoir for fuel. A frame for supporting the cannister in the fuel tank has legs which straddle the cannister. Side bars slidable vertically on the legs have horizontal pivot pins which pivotally support the cannister. The cannister is in the form of an elongated cylindrical body and is rotated to a vertical or upright position for insertion into the fuel tank. After insertion, the cannister is rotated to a horizontal position of use in which it is spaced a substantial distance above the bottom wall of the fuel tank. The legs are supported on the bottom wall of the fuel tank. The side bars are connected to the top wall of the fuel tank. Springs carried by the legs press upwardly on the side bars.

2 Claims, 2 Drawing Sheets

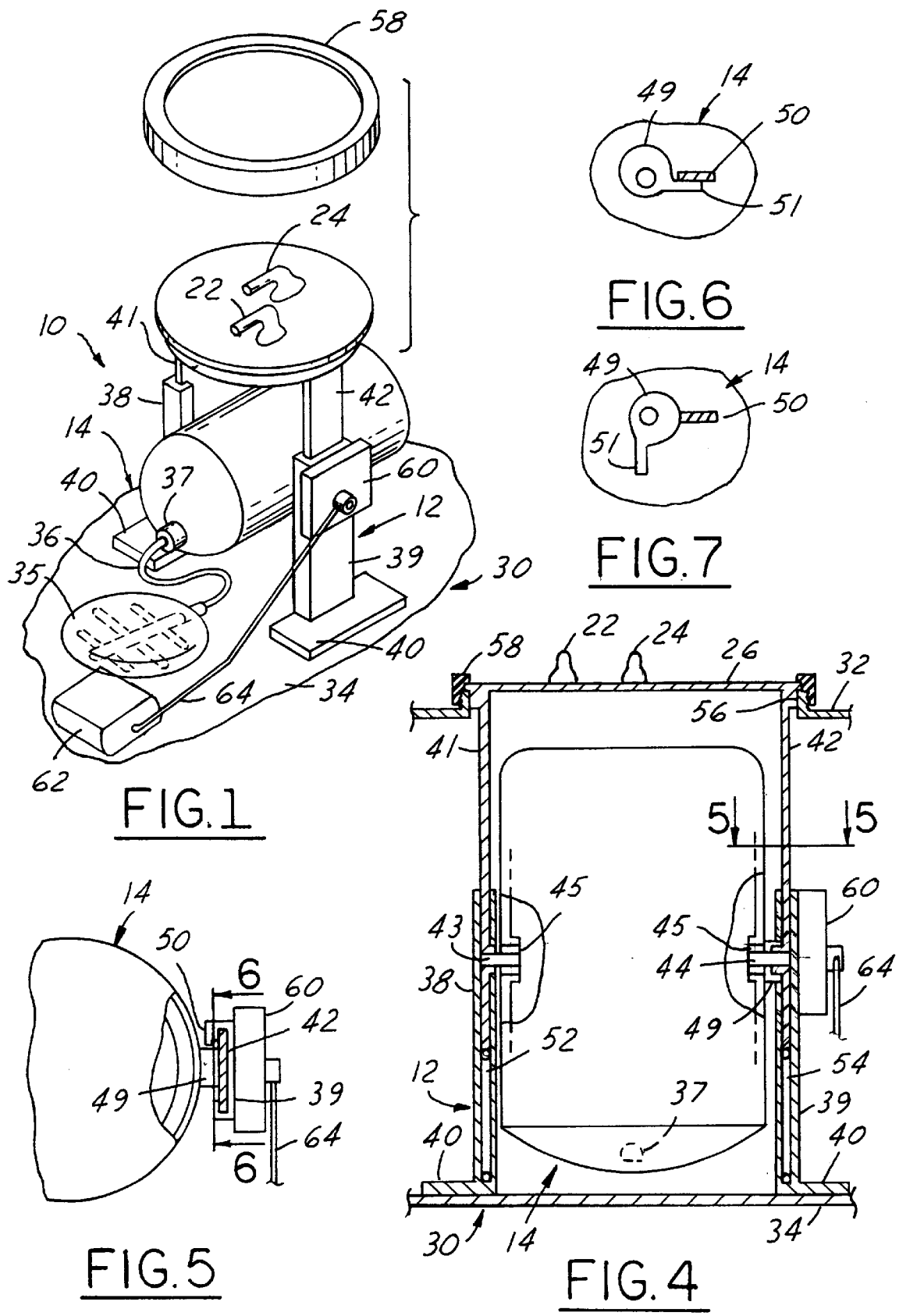

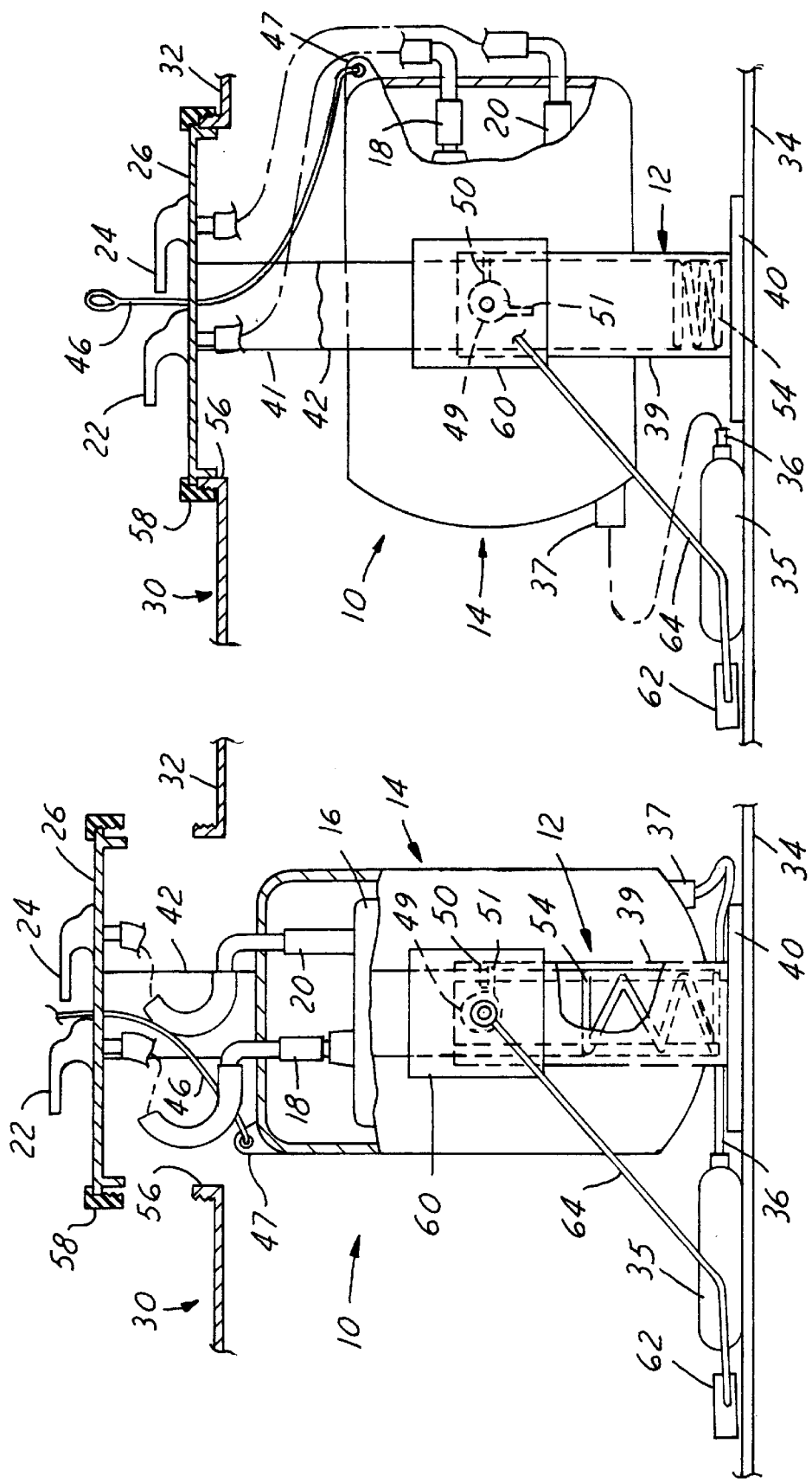

PIVOTAL FUEL SENDING UNIT

This invention relates generally to fuel sending units and more particularly to a pivotal fuel sending unit for delivering fuel from the fuel tank to the engine of an automotive vehicle.

BACKGROUND AND SUMMARY OF THE INVENTION

The fuel sending unit of this invention is intended primarily for vehicles subject to upward impacts on the fuel tank, such, for example, as off-road vehicles with shallow fuel tanks.

Fuel sending units are mounted inside the fuel tank, and typically include a cannister providing a reservoir for fuel and a pump in the reservoir. Upward impacts on the bottom of the fuel tank can damage the cannister and/or the pump, and can also damage or fracture the attachment of the fuel sending unit to a wall of the fuel tank, sometimes producing leaks.

The fuel sending unit is installed by inserting it endwise through an opening in an upper wall of the fuel tank. In this upright position, the bottom of the cannister of the fuel sending unit is close to the bottom wall of the fuel tank and thus close to the site of any bottom wall impact. However, in accordance with this invention, the cannister is capable of being pivoted 90° to a horizontal position of use in which it is spaced a substantial distance above the bottom wall and well out of harms way.

More particularly, the cannister of the fuel sending unit is mounted on a frame within the fuel tank for pivotal movement about a horizontal axis. Preferably the frame has laterally spaced legs which straddle the cannister. Side bars are mounted on the legs for vertical sliding movement, and horizontal pivot pins carried by the side bars are connected to opposite sides of the cannister. In the embodiment about to described, the side bars are connected to an upper wall of the fuel tank, and the legs are supported on a lower wall of the fuel tank. Compression springs support the side bars and urge them in an upward direction.

One object of this invention is to provide a fuel sending unit, adapted particularly for off-road vehicles subject to upward impact on the fuel tank, having the foregoing features and capabilities.

Another object is to provide a fuel sending unit which is composed of a relatively few simple parts, is rugged and durable in use, and is capable of being inexpensively manufactured and easily installed.

These and other objects, features and advantages of the invention will become more apparent as the following description proceeds, especially when considered with the accompanying drawings.

BRIEF DESCRIPTION OF THE DRAWINGS

FIG. 1 is an exploded perspective view of a fuel sending unit constructed in accordance with the invention.

FIG. 2 is an enlarged view, with parts broken away and in section, showing the fuel sending unit immediately after installation in a fuel tank, with the cannister of the sending unit in an upright position and the top cap or flange separated from the fuel tank.

FIG. 3 is a view similar to FIG. 2 but shows the cannister rotated 90° to a horizontal position.

FIG. 4 is a view of the structure shown in FIG. 2 as seen from the side, with parts broken away and in section.

FIG. 5 is a fragmentary sectional view taken on the line 5—5 in FIG. 4.

FIG. 6 is a fragmentary detail view, taken on the line 6—6 in FIG. 5, showing a device for retaining the cannister in horizontal position.

FIG. 7 is a view similar to FIG. 6 but shows the parts in a different position.

DETAILED DESCRIPTION OF THE PREFERRED EMBODIMENT

Referring now more particularly to the drawings, there is shown a fuel sending unit 10 which includes a frame 12 and a cannister 14. The cannister 14 provides a reservoir for fuel and inside the reservoir is a pump 16 for delivering fuel to an engine of an automotive vehicle. Flexible feed and return lines 18 and 20 lead from the pump through fittings 22 and 24 in a top cap or flange 26, and from fittings 22 and 24 through lines (not shown) to the engine. The frame 12 supports the sending unit 10 inside a fuel tank 30 of the vehicle. The fuel tank 30 is relatively shallow, that is, it is of relatively small dimension measured from its top wall 32 to its bottom wall 34. Fuel in the fuel tank 30 enters the reservoir of the cannister 14 through a filter 35, a line 36 and a fitting 37.

The frame 12 includes a lower frame unit having a pair of laterally spaced apart, vertical, parallel legs 38 and 39 which straddle the cannister 14. Feet 40 on the lower ends of the legs support the legs on the bottom wall 34 of the fuel tank. The frame 12 also includes an upper frame unit having side bars 41 and 42 mounted on the respective legs 38 and 39 for vertical sliding movement. The upper ends of the side bars 41 and 42 are connected to the top cap or flange 26.

Aligned horizontal pivot pins 43 and 44 project inwardly from the respective side bars 41 and 42 and extend through bushings 50 in the opposite side walls of the cannister 14. The cannister is an elongated, hollow, cylindrical body and can pivot on the pivot pins 43 and 44 from the vertical position shown in FIG. 2 to the horizontal position of FIG. 3.

The cannister 14 may be rotated from the FIG. 2 position to the FIG. 3 position manually as by a cord 46 connected to a bracket 47 on one end of the cannister. The cannister is releasably retained in the FIG. 3 position by a suitable releasable retainer, such as an eccentric cam 49 fixed to the pivot pin 44 and a stop 50 on the leg 39 (see FIGS. 2, 3, 6 and 7). A pin 51 on the cam engages the stop 50 to hold the cannister 14 in the upright position of FIG. 2. The cam 49 wedges against the stop 50 to frictionally hold the cannister in the horizontal position of FIG. 3.

Compression coil springs 52 and 54 are carried by the respective legs 38 and 39. These springs press upwardly against the side bars 41 and 42 to resiliently support the side bars and the cannister 14.

The top cap or flange 26 closes and seals an opening 56 in the top wall 32 of the fuel tank 30 and is releasably secured thereto by a lock ring 58.

A level sensor 60 is mounted on the leg 39 of the frame. A float 62 is connected to the level sensor by a pivoted arm 64. The float is adapted to ride or float of the surface of fuel in the fuel tank to indicate the amount of fuel. This information is transmitted by the level sensor to a fuel gauge (not shown) on the instrument panel of the vehicle.

The fuel sending unit 10 is installed in the fuel tank 30 by inserting it endwise so that it will pass through the opening 56 in the upper wall 32. When thus inserted, the cannister 14 is upright and the bottom of the cannister is close to the bottom wall 34 of the fuel tank (see FIG. 2). However, in accordance with this invention, the cannister is pivoted 90° to a horizontal position of use shown in FIG. 3, in which position the cannister is spaced a substantial distance from the bottom wall 34 of the fuel tank. An upward impact on the bottom wall may raise the legs 38 and 39 and compress the springs 52 and 54, but the side bars 41 and 42 and cannister 14 will be protected from the effects of the impact by the slidable connection between the legs and the side bars and the resilient cushioning of the springs. The cannister normally will not be disturbed.

What is claimed is:

1. A fuel sending unit in combination with a fuel tank of a vehicle which is subject to upward impacts on the fuel tank comprising:

a canister providing a reservoir for fuel, a supporting frame mounted within the fuel tank, and means mounting the canister on said frame for pivotal movement about a horizontal axis, wherein said canister is in the form of an elongated cylindrical body, said frame comprises legs spaced apart laterally to straddle the canister, side bars mounted on said respective legs for vertical sliding movement, said mounting means comprising aligned horizontal pivot pins carried by said respective side bars and pivotally supporting opposite sides of said canister, said canister being rotatable on said pivot pins from a vertical position for insertion through an upper wall of the fuel tank to a horizontal position of use, means for releasably retaining said canister in said horizontal position, means connecting said side bars to the upper wall of the fuel tank such that the canister is spaced a substantial distance above a lower wall of the fuel tank, means supporting said legs on the lower wall of the fuel tank, means for rotating said canister from the vertical position to the horizontal position thereof, and further including spring means pressing upwardly on said side bars.

2. A fuel sending unit according to claim 1, wherein said spring means comprise compression springs carried by said respective legs.

* * * * *